No. 787,880. PATENTED APR. 18, 1905.
J. B. ENTZ.
SYSTEM OF ELECTRICAL DISTRIBUTION.
APPLICATION FILED APR. 23, 1904.
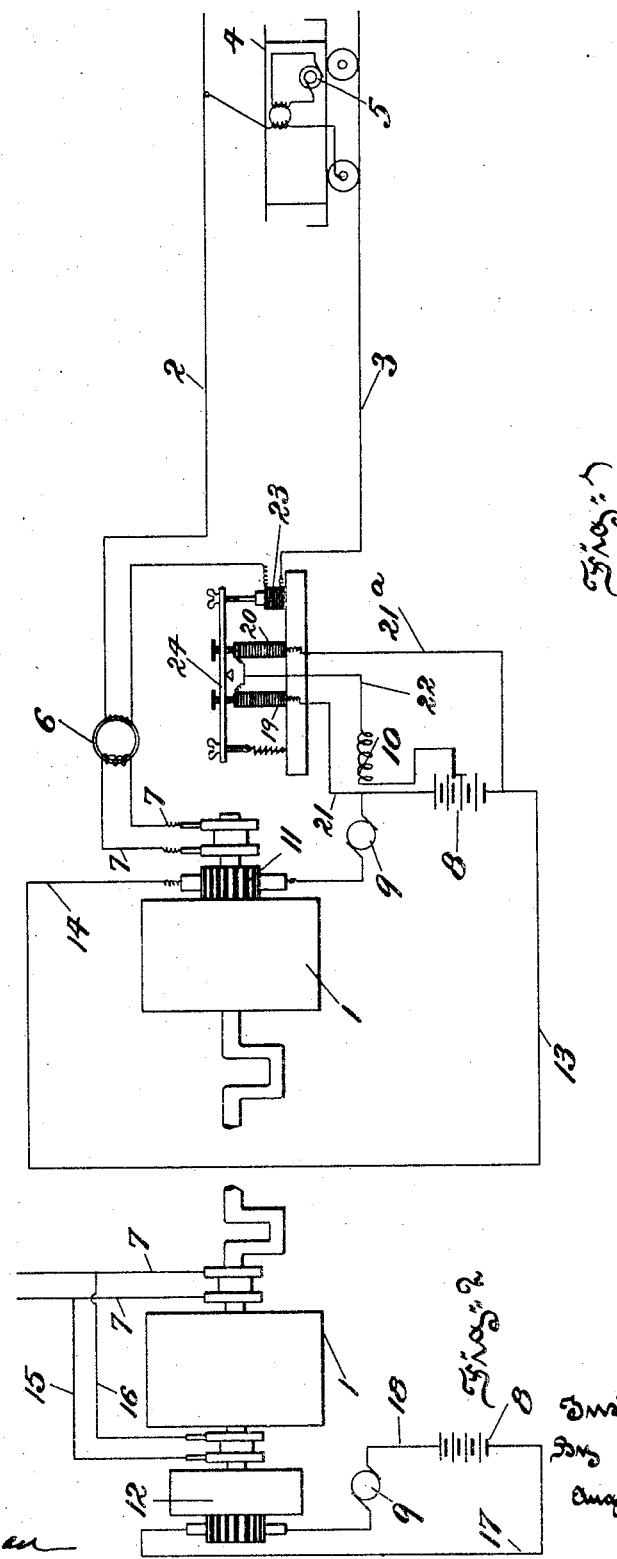

No. 787,880. Patented April 18, 1905.

UNITED STATES PATENT OFFICE.

JUSTUS B. ENTZ, OF PHILADELPHIA, PENNSYLVANIA, ASSIGNOR TO THE ELECTRIC STORAGE BATTERY COMPANY, OF PHILADELPHIA, PENNSYLVANIA, A CORPORATION OF NEW JERSEY.

SYSTEM OF ELECTRICAL DISTRIBUTION.

SPECIFICATION forming part of Letters Patent No. 787,880, dated April 18, 1905.

Application filed April 23, 1904. Serial No. 204,528.

*To all whom it may concern:*

Be it known that I, JUSTUS B. ENTZ, a citizen of the United States, residing at the city of Philadelphia, in the county of Philadelphia and State of Pennsylvania, have invented a new and useful System of Electrical Distribution, of which the following is a specification.

The object of the present invention is to provide for obtaining the advantages afforded by the use of a storage battery in connection with an alternating-current generator or generators; and to this and other ends hereinafter set forth the invention, stated in general terms, comprises the provision of means for mechanically insuring synchronism of the mechanically-driven generator and of the transforming provisions which coöperate with the battery, whereby the frequency of the current generated by the alternating generator and of the superimposed battery-current is the same, and the invention further comprises the improvements to be presently described and finally claimed.

The nature, characteristic features, and scope of my invention will be more fully understood from the following description, taken in connection with the accompanying drawings, forming part hereof, and in which—

Figure 1 is a view diagrammatically illustrating an installation embodying features of the invention, and Fig. 2 is a view diagrammatically illustrating a modification of the arrangement shown in Fig. 1.

In the drawings, 1 is a generator generating alternating currents, which feed the working circuit 2 3, which supplies translating devices, as the trolley-car 4, fitted with an alternating-current motor 5. As shown, use is made of a transformer 6 and of leads 7.

8 is a storage battery, and 9 is the suitably-driven armature of the booster, whose field is indicated at 10. There are transformer provisions interposed between the battery and the working circuit, which serve to convert direct current from the battery into alternating current and alternating current from the line into direct current, and these provisions are mechanically integral or connected with the alternating generator, which in its turn is mechanically driven by the suitable prime mover. (Not shown.) In Fig. 1 such transforming provisions comprise a commutator 11 on the generator 1, and, as shown in Fig. 2, the transforming provisions comprise a rotary transformer 12, tied to the generator by mounting it on the generator-shaft. The transforming provisions and the alternating generator are held in synchronism, so that the frequency of the current generated by the alternating generator and of the superimposed battery-current is the same.

As shown in Fig. 1, the same coils which generate the alternating current also transform the direct current from the battery into alternating current as it passes through them to the line along with the current generated. Thus the frequency of the generated current and of the superimposed battery-current is the same. The overload capacity of the generator takes care of the extra battery-current, which passes through and is simply converted into alternating current by it.

In Fig. 2 the rotary converter or transformer provisions 12 are mounted upon the same shaft, which insures synchronism.

Referring to Fig. 1, at times of light load on the circuit 2 3 the booster 9, as is usual, causes the battery 8 to charge, and at times of heavy load on the working circuit 2 3 the booster 9 influences the battery to discharge, which it does by the circuit 13 14 through the commutator 11 and coils of the generator, which transform it and deliver it as alternating current to the circuit 7 7 along with and at the same frequency as the alternating current generated.

The operation of the modification shown in Fig. 2 is as above described, except that there are separate coils 12 for converting the battery-current into alternating current and feeding it by the wires or conductors 15 and 16. In this figure the battery-circuit is indicated at 17 and 18. Of course a variety of devices may be employed for influencing the booster-field 10 to cause the battery to properly charge or discharge. For the purposes of explanation I have selected for this purpose the regulator forming the subject-matter of my application serially numbered 155,976.

19 and 20 are groups of material, as carbon, of which the electrical resistance is responsive to pressure.

21 and 21$^a$ are conductors, which supply current through both said groups.

22 is a connection extending from intermediate the groups through the field 10 to a point midway of the battery.

23 is a solenoid interposed in the working circuit or lead 3 and connected with the pivotal counterbalanced beam 24, which is adapted to exert pressure on one and relieve pressure from the other of said groups.

Assuming that the battery is discharging and that pressure is exerted on the group 20, thereby diminishing its resistance and at the same time relieving pressure on the group 19 and increasing its resistance, current passes from the middle point of the battery through the field 10, through 20, through 21$^a$, and this causes the booster-voltage to change properly or fall, so as to permit the battery to discharge. In the event of a light load on the working circuit the pressure on 20 is diminished and on 19 increased. Thus the circuit is by 21 19 22 through 10 to the middle of the battery. Thus the direction through the field-coil 10 is reversed and the booster-voltage properly adjusted or increased to charge the battery. Of course the extremes of regulation have been described, but the regulation intermediate of the extremes will be readily understood.

In this system the source or generator of alternating current is driven by a prime mover and the transforming provisions are mechanically tied to or connected with said source, so that the frequency of the current generated by the source or generator and the frequency of the superimposed battery-current are the same.

It will be obvious to those skilled in the art to which my invention appertains that modifications may be made in detail without departing from the spirit thereof. Hence I do not limit myself to the precise construction and arrangement of parts hereinabove set forth and illustrated in the accompanying drawings; but,

Having thus described the nature and objects of my invention, what I claim as new, and desire to secure by Letters Patent, is—

1. A system of electrical distribution comprising the combination of a working circuit, a battery provided with a booster and its circuit connections, a generator for generating alternating current and feeding the working circuit, a prime mover for driving the generator, transforming provisions interposed between the working circuit and battery for converting direct and alternating current to permit the battery to charge and discharge, and means for mechanically insuring synchronism of the generator and transforming provisions whereby the frequency of the current generated by the alternating generator and of the superimposed battery-current is the same, substantially as described.

2. A system of electrical distribution comprising the combination of a working circuit, a battery provided with a booster and its circuit connection, an alternating generator feeding the working circuit and provided with a commutator, a prime mover for driving the generator, and connections between the commutator and battery, whereby the frequency of the current generated and of the superimposed battery-current is the same, substantially as described.

In testimony whereof I have hereunto signed my name.

JUSTUS B. ENTZ.

Witnesses:
W. J. JACKSON,
K. M. GILLIGAN.